(12) United States Patent
Sari

(10) Patent No.: US 6,556,558 B1
(45) Date of Patent: Apr. 29, 2003

(54) TRANSMISSION METHOD FOR USE IN A MULTIPLE ACCESS RADIOCOMMUNICATION SYSTEM

(75) Inventor: Hikmet Sari, Creteil (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/417,081

(22) Filed: Oct. 13, 1999

(30) Foreign Application Priority Data

Oct. 15, 1998 (FR) .............................................. 98 12928

(51) Int. Cl.[7] ................................................ H04B 7/216
(52) U.S. Cl. ...................................... 370/342; 370/462
(58) Field of Search ................................. 370/335, 342, 370/445, 447, 462, 204, 211; 455/67.1, 63.3, 63; 375/219

(56) References Cited

U.S. PATENT DOCUMENTS 5,197,061 A * 3/1993 Halbert-Lassalle et al. . 370/204

5,600,672 A * 2/1997 Oshima et al. ............. 375/219

FOREIGN PATENT DOCUMENTS

| EP | 0 630 132 A2 | 12/1994 |
| FR | 2 719 959 A1 | 11/1995 |

* cited by examiner

Primary Examiner—Vivian Chin
Assistant Examiner—Eliseo Ramos-Feliciano
(74) Attorney, Agent, or Firm—Sughrue Mion, PLLC

(57) ABSTRACT

In a transmission method in a multiple access radiocommunication system with orthogonal transmission resources, to cater for a number of users greater than the number of transmission resources of the system, at least one of the transmission resources is shared at a given time by at least two users. The users sharing a transmission resource change with time so as to divide the deterioration of the signal to noise ratio resulting from such sharing as evenly as possible between the various users. The deterioration of the signal to noise ratio is further reduced by differentiating the signals corresponding to users sharing the same resource at a given time in terms of their transmit level.

4 Claims, 4 Drawing Sheets

| | $U_1$ | $U_2$ | $U_3$ | $U_4$ | $U_5$ | $U_6$ | $U_7$ | $U_8$ | $U_9$ | $U_{10}$ |
|---|---|---|---|---|---|---|---|---|---|---|
| t = 1 | $S_1$ | $S_1$ | $S_2$ | $S_3$ | $S_4$ | $S_5$ | $S_5$ | $S_6$ | $S_7$ | $S_8$ |
| t = 2 | $S_1$ | $S_2$ | $S_2$ | $S_3$ | $S_4$ | $S_5$ | $S_6$ | $S_6$ | $S_7$ | $S_8$ |
| t = 3 | $S_1$ | $S_2$ | $S_3$ | $S_3$ | $S_4$ | $S_5$ | $S_6$ | $S_7$ | $S_7$ | $S_8$ |
| t = 4 | $S_1$ | $S_2$ | $S_3$ | $S_4$ | $S_4$ | $S_5$ | $S_6$ | $S_7$ | $S_8$ | $S_8$ |
| t = 5 | $S_1$ | $S_2$ | $S_3$ | $S_4$ | $S_5$ | $S_5$ | $S_6$ | $S_7$ | $S_8$ | $S_1$ |
| t = 6 | $S_2$ | $S_2$ | $S_3$ | $S_4$ | $S_5$ | $S_6$ | $S_6$ | $S_7$ | $S_8$ | $S_1$ |
| t = 7 | $S_2$ | $S_3$ | $S_3$ | $S_4$ | $S_5$ | $S_6$ | $S_7$ | $S_7$ | $S_8$ | $S_1$ |
| t = 8 | $S_2$ | $S_3$ | $S_4$ | $S_4$ | $S_5$ | $S_6$ | $S_7$ | $S_8$ | $S_8$ | $S_1$ |
| t = 9 | $S_2$ | $S_2$ | $S_4$ | $S_5$ | $S_5$ | $S_6$ | $S_7$ | $S_8$ | $S_1$ | $S_1$ |
| t = 10 | $S_2$ | $S_3$ | $S_4$ | $S_5$ | $S_6$ | $S_6$ | $S_7$ | $S_8$ | $S_1$ | $S_2$ |
| t = 11 | $S_3$ | $S_3$ | $S_4$ | $S_5$ | $S_6$ | $S_7$ | $S_7$ | $S_8$ | $S_1$ | $S_2$ |
| t = 12 | $S_3$ | $S_4$ | $S_4$ | $S_5$ | $S_6$ | $S_7$ | $S_8$ | $S_8$ | $S_1$ | $S_2$ |

FIG_1

|     | $U_1$ | $U_2$ | $U_3$ | $U_4$ | $U_5$ | $U_6$ | $U_7$ | $U_8$ | $U_9$ |
|-----|-------|-------|-------|-------|-------|-------|-------|-------|-------|
| t = 1  | $S_1$ | $S_1$ | $S_2$ | $S_3$ | $S_4$ | $S_5$ | $S_6$ | $S_7$ | $S_8$ |
| t = 2  | $S_1$ | $S_2$ | $S_2$ | $S_3$ | $S_4$ | $S_5$ | $S_6$ | $S_7$ | $S_8$ |
| t = 3  | $S_1$ | $S_2$ | $S_3$ | $S_3$ | $S_4$ | $S_5$ | $S_6$ | $S_7$ | $S_8$ |
| t = 4  | $S_1$ | $S_2$ | $S_3$ | $S_4$ | $S_4$ | $S_5$ | $S_6$ | $S_7$ | $S_8$ |
| t = 5  | $S_1$ | $S_2$ | $S_3$ | $S_4$ | $S_5$ | $S_5$ | $S_6$ | $S_7$ | $S_8$ |
| t = 6  | $S_1$ | $S_2$ | $S_3$ | $S_4$ | $S_5$ | $S_6$ | $S_6$ | $S_7$ | $S_8$ |
| t = 7  | $S_1$ | $S_2$ | $S_3$ | $S_4$ | $S_5$ | $S_6$ | $S_7$ | $S_7$ | $S_8$ |
| t = 8  | $S_1$ | $S_2$ | $S_3$ | $S_4$ | $S_5$ | $S_6$ | $S_7$ | $S_8$ | $S_8$ |
| t = 9  | $S_1$ | $S_2$ | $S_3$ | $S_4$ | $S_5$ | $S_6$ | $S_7$ | $S_8$ | $S_1$ |
| t = 10 | $S_2$ | $S_2$ | $S_3$ | $S_4$ | $S_5$ | $S_6$ | $S_7$ | $S_8$ | $S_1$ |
| t = 11 | $S_2$ | $S_3$ | $S_3$ | $S_4$ | $S_5$ | $S_6$ | $S_7$ | $S_8$ | $S_1$ |
| t = 12 | $S_2$ | $S_3$ | $S_4$ | $S_4$ | $S_5$ | $S_6$ | $S_7$ | $S_8$ | $S_1$ |

FIG_2

| | $U_1$ | $U_2$ | $U_3$ | $U_4$ | $U_5$ | $U_6$ | $U_7$ | $U_8$ | $U_9$ |
|---|---|---|---|---|---|---|---|---|---|
| t = 1 | $S_1$ | $S_1$ | $S_2$ | $S_3$ | $S_4$ | $S_5$ | $S_6$ | $S_7$ | $S_8$ |
| t = 2 | $S_1$ | $S_2$ | $S_3$ | $S_3$ | $S_4$ | $S_5$ | $S_6$ | $S_7$ | $S_8$ |
| t = 3 | $S_1$ | $S_2$ | $S_3$ | $S_4$ | $S_5$ | $S_5$ | $S_6$ | $S_7$ | $S_8$ |
| t = 4 | $S_1$ | $S_2$ | $S_3$ | $S_4$ | $S_5$ | $S_6$ | $S_7$ | $S_7$ | $S_8$ |
| t = 5 | $S_1$ | $S_2$ | $S_3$ | $S_4$ | $S_5$ | $S_6$ | $S_7$ | $S_8$ | $S_1$ |
| t = 6 | $S_2$ | $S_3$ | $S_3$ | $S_4$ | $S_5$ | $S_6$ | $S_7$ | $S_8$ | $S_1$ |
| t = 7 | $S_2$ | $S_3$ | $S_4$ | $S_5$ | $S_5$ | $S_6$ | $S_7$ | $S_8$ | $S_1$ |
| t = 8 | $S_2$ | $S_3$ | $S_4$ | $S_5$ | $S_6$ | $S_7$ | $S_7$ | $S_8$ | $S_1$ |
| t = 9 | $S_2$ | $S_3$ | $S_4$ | $S_5$ | $S_6$ | $S_7$ | $S_8$ | $S_1$ | $S_1$ |
| t = 10 | $S_3$ | $S_3$ | $S_4$ | $S_5$ | $S_6$ | $S_7$ | $S_8$ | $S_1$ | $S_2$ |
| t = 11 | $S_3$ | $S_4$ | $S_5$ | $S_5$ | $S_6$ | $S_7$ | $S_8$ | $S_1$ | $S_2$ |
| t = 12 | $S_3$ | $S_4$ | $S_5$ | $S_6$ | $S_7$ | $S_7$ | $S_8$ | $S_1$ | $S_2$ |

FIG_3

| | $U_1$ | $U_2$ | $U_3$ | $U_4$ | $U_5$ | $U_6$ | $U_7$ | $U_8$ | $U_9$ | $U_{10}$ |
|---|---|---|---|---|---|---|---|---|---|---|
| t = 1 | $S_1$ | $S_1$ | $S_2$ | $S_3$ | $S_4$ | $S_5$ | $S_5$ | $S_6$ | $S_7$ | $S_8$ |
| t = 2 | $S_1$ | $S_2$ | $S_2$ | $S_3$ | $S_4$ | $S_5$ | $S_6$ | $S_6$ | $S_7$ | $S_8$ |
| t = 3 | $S_1$ | $S_2$ | $S_3$ | $S_3$ | $S_4$ | $S_5$ | $S_6$ | $S_7$ | $S_7$ | $S_8$ |
| t = 4 | $S_1$ | $S_2$ | $S_3$ | $S_4$ | $S_4$ | $S_5$ | $S_6$ | $S_7$ | $S_8$ | $S_8$ |
| t = 5 | $S_1$ | $S_2$ | $S_3$ | $S_4$ | $S_5$ | $S_5$ | $S_6$ | $S_7$ | $S_8$ | $S_1$ |
| t = 6 | $S_2$ | $S_2$ | $S_3$ | $S_4$ | $S_5$ | $S_6$ | $S_6$ | $S_7$ | $S_8$ | $S_1$ |
| t = 7 | $S_2$ | $S_3$ | $S_3$ | $S_4$ | $S_5$ | $S_6$ | $S_7$ | $S_7$ | $S_8$ | $S_1$ |
| t = 8 | $S_2$ | $S_3$ | $S_4$ | $S_4$ | $S_5$ | $S_6$ | $S_7$ | $S_8$ | $S_8$ | $S_1$ |
| t = 9 | $S_2$ | $S_2$ | $S_4$ | $S_5$ | $S_5$ | $S_6$ | $S_7$ | $S_8$ | $S_1$ | $S_1$ |
| t = 10 | $S_2$ | $S_3$ | $S_4$ | $S_5$ | $S_6$ | $S_6$ | $S_7$ | $S_8$ | $S_1$ | $S_2$ |
| t = 11 | $S_3$ | $S_3$ | $S_4$ | $S_5$ | $S_6$ | $S_7$ | $S_7$ | $S_8$ | $S_1$ | $S_2$ |
| t = 12 | $S_3$ | $S_4$ | $S_4$ | $S_5$ | $S_6$ | $S_7$ | $S_8$ | $S_8$ | $S_1$ | $S_2$ |

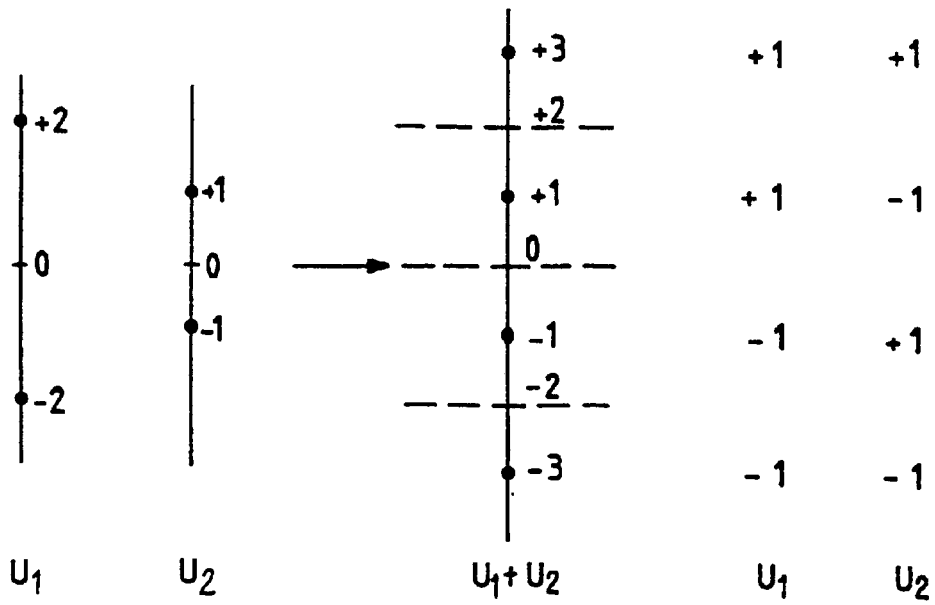
FIG_4
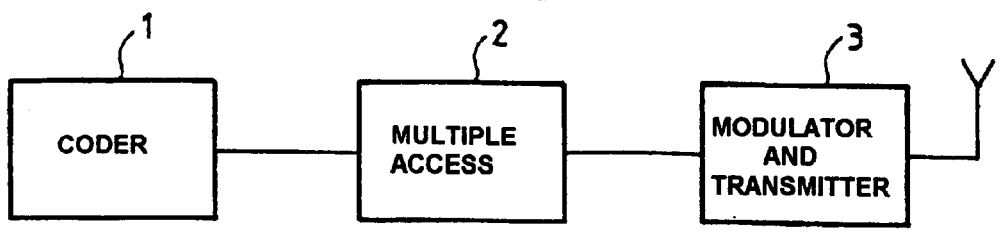
FIG_5
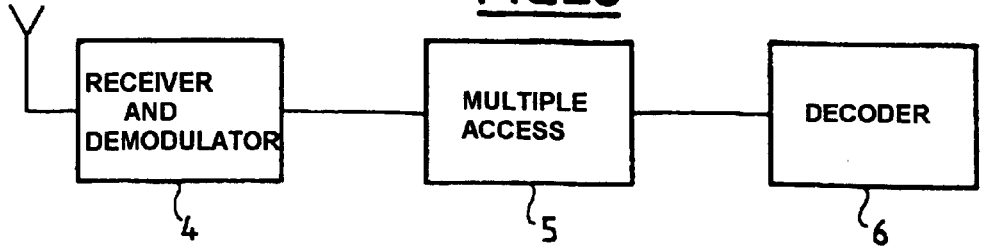
FIG_6

TRANSMISSION METHOD FOR USE IN A MULTIPLE ACCESS RADIOCOMMUNICATION SYSTEM

BACKGROUND OF THE INVENTION

1. Field of the Invention

The present invention is generally concerned with multiple access radiocommunication systems.

2. Description of the Prior Art

Various multiple access techniques exist, including the code-division multiple access (CDMA) technique and the time-division multiple access (TDMA) technique. Generally speaking, the CDMA technique has been in vogue in recent years and is now embodied in a number of standards for terrestrial communications and for satellite systems.

There are two basic CDMA techniques. The first uses pseudo-random sequences to spread the spectrum at the transmitter and to despread it at the receiver. This technique is referred to hereinafter as the PN-CDMA (pseudo-noise CDMA) technique. The second technique uses orthogonal sequences such as Walsh-Hadamord sequences. This technique is referred to hereinafter as the OCDMA (orthogonal CDMA) technique.

The theory of multiple access techniques like the TDMA, OCDMA and PN-CDMA techniques referred to above will now be briefly described.

Consider a point-multipoint radiocommunication system in which a central station serves N users.

The TDMA technique time-division multiplexes the signals of the various users to form a time-division multiplex also referred to as a frame. The uplink frame is divided into N time slots and each time slot is allocated to one user. In other words, the signals emanating from the various users are separated in time so that they con be detected by the central station with no mutual interference. If W Hz is the bandwidth needed to transmit a bit rate of D bauds using the modulation technique employed, a TDMA system with N users each transmitting a bit rate of D bauds requires a bandwidth of N.W Hz.

Generally speaking, the CDMA technique is based on spectrum spreading using direct sequences and originated in military communication systems. The two attributes of spectrum spreading are discretion (the signal is buried in the noise) and robustness in the face of narrowband jamming.

The OCDMA technique uses sequences that are totally orthogonal to each other. Accordingly there is no mutual interference between the spread signals emanating from the various users. If the bandwidth available on the uplink channel to the central station is N times the bandwidth needed for each individual user, then the OCDMA technique caters for exactly N users, because the number of orthogonal sequences of length N is indeed N. This indicates that the capacity of the OCDMA technique is exactly the same as that of the TDMA technique.

In the PN-CDMA technique, the spreading sequences are pseudo-random sequences and are therefore not orthogonal. Consequently, there is interference as soon as there are two active users. If all the signals are of the same power, the interference from one user to another has a power of 1/N, if the power of the wanted signal is normalized at 1. If p users are active, each user receives interference at a level of (p−1)/N from the other p−1 users. Assuming that N users are active, the ratio of the wanted signal to the total interference is then equal to (N−1)/N (i.e. almost equal to 1), which indicates that it is not possible to have N users in a PN-CDMA system in which the spreading factor is N. The number of users that can be served is directly related to the deterioration that can be accepted. For example, if interference is to be limited to 30% of the power of the wanted signal, the number of users must be limited to 0.3N, which is more than three times less than the capacity of TDMA and OCDMA systems.

The foregoing discussion shows that the smallest capacity is that of the PN-CDMA technique. It might even be thought that this is not a natural multiple access technique, because there is interference as soon as there are two active users, whereas with the other techniques there is strictly no interference up to a number N of users. On the other hand, the conventional TDMA and OCDMA techniques cannot add even one additional user once the maximum number has been reached.

One object of the present invention is to provide a variant of the above multiple access technique offering greater capacity than the conventional technique.

A more particular object of the present invention is to provide a transmission method for use in multiple access radiocommunication systems with orthogonal transmission resources which cater for a number M of users greater than the number N of transmission resources of the system and in which there is no deterioration of the signal to noise ratio for a number of users less than or equal to N and the deterioration of the signal to noise ratio is minimal if the number of users becomes greater than N.

SUMMARY OF THE INVENTION

The present invention therefore consists in a transmission method in a multiple access radiocommunication system with orthogonal transmission resources, in which method, for a number of users greater than the number of transmission resources of the system:

at least one of said transmission resources is shared at a given time by at least two users, the users sharing a transmission resource change with time so as to divide the deterioration of the signal to noise ratio resulting from such sharing as evenly as possible between the various users, and the deterioration of the signal to noise ratio is further reduced by differentiating the signals corresponding to users sharing the same resource at a given time in terms of their transmit level.

The present invention equally consists in a transmitter and a receiver for implementing the above method.

Other objects and features of the present invention will become apparent on reading the following description of embodiments of the invention, which is given with reference to the accompanying drawings.

BRIEF DESCRIPTION OF THE DRAWINGS

FIG. 1 shows a first example of allocation of transmission resources in accordance with the invention.

FIG. 2 shows a second example of allocation of transmission resources in accordance with the invention.

FIG. 3 shows a third example of allocation of transmission resources in accordance with the invention.

FIG. 4 shows the principle of differentiating signals corresponding to users sharing the same resource at a given time on the basis of their transmit level.

FIG. 5 shows the type of means to be provided in a transmitter of the invention.

FIG. 6 shows the type of means to be provided in a receiver of the invention.

DETAILED DESCRIPTION OF THE PREFERRED EMBODIMENTS

The present invention can increase the capacity of multiple access techniques using orthogonal transmission resources, in particular the OCDMA technique (in which case the transmission resources are spreading sequences) and the TDMA technique (in which case the transmission resources are time slots). The description refers to the OCDMA technique, but it is equally applicable to the TDMA technique in particular, based on the same reasoning and the same approach.

Consider by way of example a system with a spreading factor N which is to cater for N+1 users. In other words, one additional user is to be catered for over and above the maximum capacity N. FIGS. 1 and 2 show allocation examples for N=8 and M=9.

FIG. 1 shows an example using eight orthogonal sequences $s_1, s_2, \ldots, s_8$ for nine users $u_1, u_2, \ldots, u_9$. At time t=1 sequence $s_1$ is allocated to users $u_1$ and $u_2$ and each of the remaining seven sequences is allocated to one of the other users. Thus at time t=1 there is a collision between users $u_1$ and $u_2$ because they interfere with each other. At time t=2 it is users $u_2$ and $u_3$ who collide, sequence $s_2$ being allocated to users $u_2$ and $u_3$, while each of the remaining seven sequences is allocated to one of the other users. At time t=3 it is users $u_3$ and $u_4$ who collide, sequence $s_3$ being allocated to users $u_3$ and $u_4$, while each of the seven other users employs one of the remaining seven orthogonal sequences. And so on . . . .

Accordingly, at any time, there is a collision between two sequences, during which each of the seven remaining sequences is allocated to one of the other users. Note also that a given user comes into collision at two consecutive times, once with each of its neighbors. For example, $u_2$ collides with $u_1$ at time t=2 and with $u_3$ at time t=3. The "neighbor" concept is circular and the neighbors of $u_9$ are therefore $u_8$ and us. After the two consecutive collisions, a given user is not involved in any collision for seven unit times (a unit time can be a symbol period, or the duration of a symbol to be transmitted, for example).

FIG. 2 shows another example in which the collisions for a given user are not consecutive. To be more precise, after one collision, a user is not involved in any collision for three unit times, is then involved in another collision, and is then not involved in any collision for four unit times, after which the periodic process repeats. For example, $u_1$ collides with $u_2$ at time t=1 and then collides with $u_9$ at time t=5, collides again with $u_2$ at time t=10, and so on . . . .

FIG. 3 shows an example using eight orthogonal sequences $s_1, s_2, \ldots, s_8$ for ten users $u_1, u_2, \ldots, u_9, u_{10}$, so that in this example N=8 and M=10. Here, at time t=1, there is a collision between $u_1$ and $u_2$ (which here are using the some sequence $s_1$) and between $u_6$ and $u_7$ (which here are using the same sequence $s_5$). In the next time period the collisions are between $u_2$ and $u_3$ (which here are using the same sequence $s_2$) and between $u_7$ and $u_8$ (which here are using the same sequence $s_6$), and so on . . . .

Clearly examples other than those shown in FIGS. 1 to 3 are feasible and it is not possible to describe them all here in a comprehensive way.

For example, in FIGS. 1 to 3, the sequence(s) shared at a given time could be the same at the various times provided that at each time the sequences that are not shared are separate from the sequence(s) that is or are shared and from each other.

Similarly, in FIGS. 1 to 3, the sequences that are not shared could be allocated other than as shown by way of example in the figures, provided that at each time the sequences that are not shared are separate from each other and from the sequence(s) that is or are shared Also, and as shown in FIG. 3 in particular, a single sequence could be shared at a given time by more than two users, rather than two sequences each shared by two users, as shown.

Furthermore, the values N=8 and M=9 or M=10 have obviously been given by way of example only.

Accordingly, as a general rule, and in accordance with the invention, at least one resource is shared at a given time by at least two users and the users sharing a resource change with time, so as to share the deterioration of the signal to noise ratio that results from such sharing of resources as evenly as possible between the various users.

It is also necessary to counter interference resulting from this sharing of sequences. One solution would be to use an error correcting code capable of correcting errors resulting from the periodic collisions. However, conventional error correcting codes require at least two redundant symbols per block to correct one symbol error. In other words, with this approach each user must lose a fraction 2/(N+1) of their capacity to enable one additional user to be added.

As will now be described, the present invention can also increase the number of users without reducing their bit rate and counter interference resulting from such sharing of resources.

Refer to FIG. 1 again, for example. At time t=1, users $u_1$ and $u_2$ are in collision. Rather than sending symbols taking their values from the same alphabet with the same transmit level, the transmit level of the symbol transmitted by one of these users, user $u_1$ for example, is doubled. As shown in FIG. 4, for example, in the case of a binary alphabet, the symbol transmitted by user $u_1$ takes its values from the alphabet (−2, +2) whereas user $u_2$, like the other users, transmits symbols taking values from the alphabet (−1, +1).

In the absence of noise, the signal r(s1) received and despread using sequence $s_1$ is the sum of the symbols sent by $u_1$ and $u_2$. The signal then takes its values from the alphabet (−3, −1, +1, +3), also as shown in FIG. 4.

As also shown in FIG. 4, the symbol sent by $u_1$ is a −1 if the received signal has the value −3 or −1, and the symbol sent by $u_1$ is a +1 otherwise. The symbol sent by $u_2$ is a −1 if the signal received has the value −3 or +1, or a +1 if the signal received has the value −1 or +3.

More generally, in the presence of noise, and as also shown in FIG. 4, the detection process at the receiver can be represented as follows:

$\hat{a}_1(u_1) = -1$ and $\hat{a}_1(u_2) = -1$ if $r_1(s_1) < -2$ $\hat{a}_1(u_1) = -1$ and $\hat{a}_1(u_2) = +1$ if $-2 < r_1(s_1) < 0$ $\hat{a}_1(u_1) = +1$ and $\hat{a}_1(u_2) = -1$ if $0 < r_1(s_1) < +2$ $\hat{a}_1(u_1) = +1$ and $\hat{a}_1(u_2) = +1$ if $2 < r_1(s_1)$ In the above equations, $\hat{a}_1(u_1)$ represents the result of the decoding carried out by the receiver on the symbol sent by user $u_i$ at time t=i and $r_i(s_i)$ represents the signal received at time t=i after despreading using sequence $s_i$.

Here the decoding is done by comparing the signal $r_i(s_i)$ to various decision thresholds corresponding to various possible combinations of the various values of the various alphabets used by the various users sharing the same sequence at the time concerned. Thus, in the example considered here, said decision thresholds have the levels −2, 0, +2.

The symbols simultaneously sent by $u_1$ and $u_2$ using the same spreading sequence $s_1$ can therefore be detected simultaneously. In contrast, if the symbols sent by $u_1$ and $u_2$ were to take their values from the some alphabet, for example (−1, +1), the signal $r(s_1)$ received and despread using sequence $s_1$ would take its values from the alphabet (−2, 0, +2). There would then be an ambiguity as to the value 0, which could correspond either to sending by $u_1$ of the symbol +1 and by $u_2$ of the symbol −1 or to sending by $u_1$ of the symbol −1 and by $u_2$ of the symbol +1, and it would be impossible to restore the streams of symbols sent by users $u_1$ and $u_2$.

At the next time (t=2), it is the alphabet of one of the users $u_2$ and $u_3$, for example $u_2$ which is (−2, +2) whereas all the other users, and in particular $u_3$, send symbols from an alphabet (−1, +1). Applying the same reasoning as before, the symbols sent by $u_2$ and $u_3$ can be detected without degrading the error rate.

The process continues as above giving an alphabet (−2, +2) to user $u_3$ at time t=3, to user $u_4$ at time t=4, and so on. Thus in the example shown in FIG. 1, one time out of nine, and each user in turn, therefore sends symbols from an alphabet (−2, +2). In a system with N orthogonal sequences, the alphabet (−2, +2) therefore arrives once every N+1 symbols and the cost in average power of increasing the capacity by one user is therefore $$\Delta = 10 \cdot \log\left(\frac{N+4}{N+1}\right)$$

This is the deterioration of the signal to noise ratio (S/N) expressed in dB. For example, for N=64, the deterioration is 0.2 dB. With N=128, the deterioration is only 0.1 dB per user and 10 users can therefore be added if a performance deterioration of 1 dB is acceptable.

Clearly, FIG. 4 is intended to illustrate a technique of the above kind by way of example only.

For example, the alphabets could be different from the alphabets (−2, +2) and (−1, +1) considered, provided that they enable the required differentiation.

Moreover, if more than two users were sharing the same sequence, more than two alphabets could then have to be used to enable the required differentiation.

Thus, generally speaking, using this technique, the deterioration of the signal/noise ratio is reduced by differentiating, in terms of their transmit level, signals corresponding to users sharing the same resource at a given time.

Like the PN-CDMA technique, the technique as described enables the number of users to be increased if a deterioration of performance is accepted, but unlike the PN-CDMA technique, there is no deterioration until the number of users reaches N, and the deterioration is minimal thereafter, whereas the performance of the PN-CDMA technique becomes unacceptable well before the number of users has reached this value.

The present invention also consists in a transmitter and a receiver for implementing a method of the above kind.

In a conventional way, a transmitter can include (FIG. 5):

means 1 for coding information to be transmitted, multiple access means 2 producing a transmission format corresponding to the multiple access technique concerned, and modulation and radio transmission means 3.

Conversely, a receiver can include (FIG. 6):

radio reception and demodulation means 4, executing operations which are the converse of those executed by the means 3, multiple access means 5 executing operations which are the converse of those executed by the means 2, and decoder means 6 executing operations which are the converse of those executed by the means 1.

According to the invention, the multiple access means 2 and 5 include means for using a transmission resource such that, for a number M of users greater than the number N of resources of the system:

at least one of said resources is shared at a given time by at least two users, and the users sharing a resource change with time, in order to distribute the deterioration of the signal to noise ratio resulting from such sharing as evenly as possible between the various users.

Such means, examples of which are shown in FIGS. 1 to 3, operate in accordance with the principle previously described. Their practical implementation giving rise to no particular difficulty, there is no need to describe these means here in more detail than stating their function.

Furthermore, the selection of transmission resource to be used in the various transmitters and receivers of the system concerned necessitates coordination within the system and corresponding information to be provided to the transmitters and receivers. However, such coordination and information operations being standard practice in such systems, they do not call for any specific description here.

According to the invention, the means 1 for coding information to be transmitted include means for differentiating signals corresponding to different users sharing the same resource at a given time in terms of their transmit level.

Similarly, the means 6 for decoding received information include means for comparing the level of the received signal to various decision thresholds corresponding to the various combinations of transmit levels for users sharing the same resource at a given time.

Such means, one example of which is shown in FIG. 4, also operate in accordance with the principle described previously. Their practical implementation not giving rise to any particular problem either, these means also do not need to be described here in more detail than stating their function.

The selection of the transmit levels and therefore the decision thresholds to be used in the various transmitters and receivers of the system concerned likewise necessitates coordination within the system and corresponding information to be provided to the transmitters and receivers. Again, such coordination and information operations are standard practice in such systems, and therefore require no specific description.

What is claimed is:

1. A transmission method in a multiple access radiocommunication system with orthogonal transmission resources, comprising:

when a number of users is greater than the number of orthogonal transmission resources of the system:

sharing at least one of said orthogonal transmission resources, at a given time, by at least two of the users, evenly changing, with time, the users sharing the at least one orthogonal transmission resource change with time, and differentiating the signals corresponding to the users sharing the same resource, at a given time, using different signal transmit levels.

2. The transmission method according to claim 1, wherein, when a number of users is not greater than the number of orthogonal transmission resources of the system, the orthogonal transmission resources are not shared by the users.

3. A transmitter for a multiple access radiocommunication system with orthogonal transmission resources, including:
means for using an orthogonal transmission resource in a system wherein, when a number of users of the system is greater than the number of the orthogonal transmission resources of said system:
at least one of said orthogonal transmission resources is shared at a given time by at least two of the users, and
the users sharing a resource are changed evenly with time; and
means for differentiating the signals sent, when sharing the same one of the orthogonal transmission resources with another of the users, by using a signal transmit level different from the signal transmit level of the another of the users.

4. A receiver for a multiple access radiocommunication system with orthogonal transmission resources, including:
means for using an orthogonal transmission resource in a system wherein, when a number of users of the system is greater than the number of the orthogonal transmission resources of said system:
at least one of said orthogonal transmission resources is shared at a given time by at least two of the users, and
the users sharing a resource are changed evenly with time; and
means for comparing a level of the received signal to various decision thresholds corresponding to various combinations of transmit levels for users sharing the same resource at a given time.

* * * * *